United States Patent
Liu

(10) Patent No.: US 9,825,837 B2
(45) Date of Patent: Nov. 21, 2017

(54) METHOD AND USER EQUIPMENT FOR DETERMINING CONTROL CHANNEL RESOURCE

(71) Applicant: HUAWEI TECHNOLOGIES CO., LTD., Shenzhen, Guangdong (CN)

(72) Inventor: Jianghua Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 221 days.

(21) Appl. No.: 14/141,014

(22) Filed: Dec. 26, 2013

(65) Prior Publication Data

US 2014/0105057 A1   Apr. 17, 2014

Related U.S. Application Data

(63) Continuation of application No. PCT/CN2012/077637, filed on Jun. 27, 2012.

(30) Foreign Application Priority Data

Jun. 27, 2011   (CN) .......................... 2011 1 0175253

(51) Int. Cl.
  *H04L 12/26* (2006.01)
  *H04L 1/18* (2006.01)
(52) U.S. Cl.
  CPC ............ *H04L 43/12* (2013.01); *H04L 1/1854* (2013.01); *H04L 1/1861* (2013.01); *H04L 1/1896* (2013.01)
(58) Field of Classification Search
  None
  See application file for complete search history.

(56) References Cited

U.S. PATENT DOCUMENTS

| 2008/0311942 A1* | 12/2008 | Kim ..................... H04L 1/1854 455/509 |
| 2010/0172290 A1* | 7/2010 | Nam ..................... H04L 1/1854 370/328 |

(Continued)

FOREIGN PATENT DOCUMENTS

| CN | 101998539 | 3/2011 |
| CN | 102870356 | 1/2013 |

(Continued)

OTHER PUBLICATIONS

International Search Report, dated Oct. 18, 2012, in corresponding International Application No. PCT/CN2012/077637 (4 pp.).

(Continued)

*Primary Examiner* — Andrew Lai
*Assistant Examiner* — Jamaal Henson
(74) *Attorney, Agent, or Firm* — Staas & Halsey LLP

(57) ABSTRACT

The present invention discloses a method and a user equipment for determining a control channel resource. The method includes: detecting a downlink control channel that carries scheduling information of a downlink data channel and is sent by a base station, where the downlink control channel is formed by at least one control channel logical element, and the at least one control channel logical element is mapped to at least one antenna port; acquiring at least one of antenna port information of a first antenna port corresponding to a first control channel logical element of the successfully detected downlink control channel and an offset, and sequence number information of the first control channel logical element; and determining, according to at least one of the antenna port information and the offset, as well as the sequence number information.

18 Claims, 7 Drawing Sheets

(A)

(B)

(56) References Cited

U.S. PATENT DOCUMENTS

| | | | |
|---|---|---|---|
| 2011/0228731 A1* | 9/2011 | Luo | H01Q 3/2605 |
| | | | 370/329 |
| 2011/0235599 A1* | 9/2011 | Nam | H04L 1/0027 |
| | | | 370/329 |
| 2011/0268062 A1 | 11/2011 | Ji et al. | |
| 2012/0003986 A1 | 1/2012 | Gorokhov et al. | |
| 2012/0051319 A1* | 3/2012 | Kwon | H04W 72/0406 |
| | | | 370/329 |
| 2012/0155413 A1 | 6/2012 | Liu et al. | |
| 2012/0320848 A1* | 12/2012 | Chen | H04W 28/06 |
| | | | 370/329 |
| 2013/0039284 A1* | 2/2013 | Marinier | H04L 5/001 |
| | | | 370/329 |
| 2013/0128826 A1 | 5/2013 | Lin et al. | |
| 2013/0272258 A1* | 10/2013 | Lee | H04B 7/0413 |
| | | | 370/329 |

FOREIGN PATENT DOCUMENTS

| | | |
|---|---|---|
| EP | 2 383 928 A2 | 11/2011 |
| EP | 2469921 | 6/2012 |
| JP | 2012-520000 | 8/2012 |
| JP | 2013-509836 | 3/2013 |
| JP | 2013-510470 | 3/2013 |
| RU | 2 319 211 | 7/2007 |
| RU | 2 421 946 | 11/2010 |
| WO | 2009/118621 A2 | 10/2009 |
| WO | 2010/051662 A1 | 5/2010 |
| WO | 2010/101411 | 9/2010 |
| WO | 2010/101411 A2 | 9/2010 |
| WO | 2011/020433 | 2/2011 |
| WO | 2011/021852 A2 | 2/2011 |
| WO | 2011/041623 A1 | 4/2011 |
| WO | 2011/054188 A1 | 5/2011 |
| WO | 2011/057211 A1 | 5/2011 |
| WO | 2011/075702 A1 | 6/2011 |

OTHER PUBLICATIONS

"Physical layer for relaying operation (Release 10)," *Evolved Universal Terrestrial Radio Access Network (E-UTRA)*, 2010, pp. 1-15, 3GPP TS 36.216 V10.1.0 (Dec. 2010) Technical Specification, 3rd Generation Partnership Project; Technical Specification Group Radio Access Network, Valbonne, France.

"Physical layer procedures (Release 10)," *Evolved Universal Terrestrial Radio Access Network (E-UTRA)*, 2010, pp. 1-98, 3GPP TS 36.213 V10.0.1 (Dec. 2010) Technical Specification, 3rd Generation Partnership Project; Technical Specification Group Radio Access Network, Valbonne, France.

R1-105505, "Transmit Diversity for Channel Selection," *3GPP TSG RAN WG1 Meeting #62bis*, Oct. 11-15, 2010, pp. 1-11, Agenda Item 6.4.4.2, Research in Motion and UK Limited, Xi'an, China.

R1-105539, "Performance evaluation for transmit diversity of PUCCH Format 1b with channel selection," *3GPP TSG RAN WG1 Meeting #62bis*, pp. 1-4, Agenda Item 6.4.4.2, Nokia Siemens Networks and Nokia, Xian, China.

"Physical Channels and Modulation (Release 10)," *Evolved Universal Terrestrial Radio Access Network (E-UTRA)*, 2011, pp. 1-103, 3GPP TS 36.211 V10.2.0 (Jun. 2011) Technical Specification, 3rd Generation Partnership Project; Technical Specification Group Radio Access Network, Valbonne, France.

"Physical layer procedures (Release 10)," *Evolved Universal Terrestrial Radio Access Network (E-UTRA)*, 2011, pp. 1-120, 3GPP TS 36.213 V10.2.0 (Jun. 2011) Technical Specification, 3rd Generation Partnership Project; Technical Specification Group Radio Access Network, Valbonne, France.

International Search Report dated Oct. 18, 2012, in corresponding International Patent Application No. PCT/CN2012/077637.

Office Action dated May 25, 2015 for corresponding Chinese Patent Application No. 201110175253.9.

Extended European Search Report dated Jun. 13, 2014 in corresponding European Patent Application No. 12805275.0.

"PUCCH Format 1/1a/1b Resource Allocation with SORTD", CATT, 3GPP TSG RAN WG1 Meeting #60, San Francisco, USA, Feb. 2010, 2pp.

Chinese Office Action dated on Jul. 3, 2014 in corresponding Chinese Patent Application No. 201110175253.9.

Search Report dated Jun. 24, 2014 in corresponding Chinese Patent Application No. 201110175253.9.

Japanese Office Action dated Jan. 20, 2015 in corresponding Japanese Patent Application No. 2014-517422.

Russian Notice of Allowance dated Mar. 21, 2016 in corresponding Russian Patent Application No. 2014102364, 17 pages.

Japanese Office Action dated Aug. 9, 2016 in corresponding Japanese Patent Application No. 2015-189791 (8 pages w/ translation).

* cited by examiner

METHOD AND USER EQUIPMENT FOR DETERMINING CONTROL CHANNEL RESOURCE

CROSS-REFERENCE TO RELATED APPLICATION

This application is a continuation of International Application No. PCT/CN2012/077637, filed on Jun. 27, 2012, which claims priority to Chinese Patent Application No. 201110175253.9, filed on Jun. 27, 2011, both of which are hereby incorporated by reference in their entireties.

TECHNICAL FIELD

The present invention relates to the field of communications, and in particular, to a method and a user equipment for determining a control channel resource.

BACKGROUND

A long term evolution (Long Term Evolution, abbreviated as "LTE") release 8/9/10 (Release 8/9/10, abbreviated as "Rel-8/9/10") communication system uses a dynamic scheduling technology to improve the performance of the communication system. That is, a base station (Evolved NodeB, abbreviated as "eNB") schedules and allocates resources according to channel conditions of each user equipment (User Equipment, abbreviated as "UE"), so that each scheduled user equipment performs transmission on its optimal channel. In a downlink transmission, the eNB sends, according to a dynamic scheduling result, a physical downlink shared channel (Physical Downlink Shared Channel, abbreviated as "PDSCH") and a corresponding physical downlink control channel (Physical Downlink Control Channel, abbreviated as "PDCCH") to each scheduled user equipment, where the PDSCH carries data sent by the eNB to the scheduled user equipment and the PDCCH is mainly used to indicate the corresponding PDSCH transmission format, that is, scheduling information, including resource allocation, a transport block size, a modulation and coding scheme, a transmission rank, precoding matrix information, and the like.

The PDCCH and the PDSCH are time division multiplexed into one subframe. Therefore, the number of PDCCHs that can be supported by one subframe is limited, that is, the number of user equipments scheduled by the base station is limited. The limited capacity of the PDCCH is more serious during further evolution of the LTE Rel-10 communication system. In particular, the evolved system generally uses a multiple-input multiple-output (Multiple Input Multiple Output, abbreviated as "MIMO") technology to increase the spectrum efficiency of the communication system. This means that the quantity of user equipments concurrently scheduled by the base station is increased, and therefore more PDCCHs are needed. In addition, an important scenario considered in the evolved system is a heterogeneous network. A specific implementation manner of this scenario is as follows: In addition to macro base stations, a plurality of remote radio units (Remote Radio Unit, abbreviated as "RRU") is set in the coverage of a macro cell, where the RRUs have the same cell identity as that of the macro cell, and each RRU can serve some user equipments independently since the PDCCH uses a demodulation reference signal (Demodulation Reference Signal, abbreviated as "DMRS")-based transmission manner. However, each RRU is transparent for the user equipment. Therefore, in this scenario, the quantity of user equipments scheduled by the base station is greatly increased, and accordingly, the required capacity of the PDCCH is also increased.

Therefore, the communication system enhances the existing PDCCH, that is, it splits some resources from an original PDSCH area to transmit an enhanced PDCCH, that is, an enhanced physical downlink control channel (Enhanced Physical Downlink Control Channel, abbreviated as "E-PDCCH"). In this way, resources allocated to a control channel are very flexible, and the capacity of the PDCCH is enlarged. In addition, the E-PDCCH may also use the DMRS-based transmission manner, so that a space can be reused to improve transmission efficiency of the control channel. For example, control channels of user equipments serving under different RRUs can occupy the same time frequency resource so long as the control channels are spatially isolated.

In the LTE Rel-8/9/10 communication system, a hybrid automatic repeat request (Hybrid Automatic Repeat Request, abbreviated as "HARQ") technology is generally used to improve the performance of the communication system, and the HARQ technology continues to be applied in an evolved communication system, for example, LTE Rel-11. Because a dynamically scheduled user equipment needs to feed back uplink acknowledgement (Acknowledgement, abbreviated as "ACK")/non-acknowledgment (Non-Acknowledgement, abbreviated as "NACK") information to the eNB, the dynamically scheduled user equipment needs to determine a resource used to feed back uplink ACK/NACK information. In consideration of randomness of dynamic scheduling and resource utilization, a resource used to feed back the uplink ACK/NACK information needs to be reserved by using a dynamic reservation method rather than by using a semi-static reservation method, that is, a resource is reserved only when the PDSCH is scheduled. Therefore, for a communication system using the HARQ technology, the technical issue to be solved is how to dynamically determine a resource used to feed back the uplink ACK/NACK information after the user equipment detects an E-PDCCH and a PDSCH.

In related technologies, in the case where the PDCCH and the PDSCH are multiplexed together, that is, in the case where the PDCCH is not enhanced, the ACK/NACK information is fed back by using a code division multiplexing manner on a physical uplink control channel (Physical Uplink Control Channel, abbreviated as "PUCCH"), that is, each user equipment modulates the ACK/NACK information by using a sequence of time-frequency two dimensional spread spectrum, and then sends the modulated ACK/NACK information. For each dynamically scheduled user equipment, a resource used to feed back the uplink ACK/NACK information is implicitly determined by a sequence number of a control channel element (Control Channel Element, abbreviated as "CCE") of the PDCCH.

However, in the case where the PDCCH, the E-PDCCH, and the PDSCH are multiplexed together, if the method for determining, by using the sequence number of the CCE, a resource used to feed back the uplink ACK/NACK information in the related technologies is still used, E-PDCCHs using the DMRS-based transmission manner under different RRUs may occupy the same time frequency resources and different DMRS ports, different E-PDCCHs are likely to have the same control channel logical number or sequence number. Therefore, this may cause a problem of conflict on the resource used to feed back ACK/NACK information between different user equipments, that is, two or more user equipments occupy the same resource, thereby imposing interference on the ACK/NACK information between different user equipments.

SUMMARY

Accordingly, embodiments of the present invention provide a method and a user equipment for determining a control channel resource, so that a resource used to feed back uplink ACK/NACK information can be dynamically determined and a problem of, resource conflict between different user equipments can be avoided.

In one aspect, an embodiment of the present invention provides a method for determining a control channel resource, where the method includes: detecting a downlink control channel that carries scheduling information of a downlink data channel and is sent by a base station, where the downlink control channel is formed by at least one control channel logical element, and the at least one control channel logical element is mapped to at least one antenna port; acquiring at least one of antenna port information of a first antenna port corresponding to a first control channel logical element of the successfully detected downlink control channel and an offset, and sequence number information of the first control channel logical element; and determining a first control channel resource according to the sequence number information and at least one of the antenna port information and the offset, where the first control channel resource is used to feed back ACK/NACK information with respect to a downlink data channel corresponding to the successfully detected downlink control channel.

In another aspect, an embodiment of the present invention provides a user equipment for determining a control channel resource, where the user equipment includes: a detecting module, configured to detect a downlink control channel that carries scheduling information of a downlink data channel and is sent by a base station, where the downlink control channel is formed by at least one control channel logical element, and the at least one control channel logical element is mapped to at least one antenna port; an acquiring module, configured to acquire at least one of antenna port information of a first antenna port corresponding to a first control channel logical element of the successfully detected downlink control channel and an offset, and sequence number information of the first control channel logical element; and a first determining module, configured to determine a first control channel resource according to the sequence number information and at least one of the antenna port information and the offset that are acquired by the acquiring module, where the first control channel resource is used to feed back ACK/NACK information with respect to a downlink data channel corresponding to the successfully detected downlink control channel.

Based on the foregoing technical solution, by using the method and the user equipment according to the embodiments of the present invention, a control channel resource used to feed back ACK/NACK information can be dynamically determined according to at least one of antenna port information of an antenna port corresponding to a control channel logical element and an offset, as well as sequence number information of the control channel logical element; and different control channel resources can be determined for different user equipments. In this way, a problem of conflict on control channel resources between different user equipments can be avoided.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained without creative efforts by a person of ordinary skill in the art based on the embodiments of the present invention shall fall within the protection scope of the present invention.

It should be understood that the technical solution of the present invention can be applied in various communication systems, for example, a global system of mobile communication (Global System of Mobile communication, abbreviated as "GSM") system, a code division multiple access (Code Division Multiple Access, abbreviated as "CDMA") system, a wideband code division multiple access (Wideband Code Division Multiple Access, abbreviated as "WCDMA") system, a general packet radio service (General Packet Radio Service, abbreviated as "GPRS") system, a long term evolution (Long Term Evolution, abbreviated as "LTE") system, an LTE frequency division duplex (Frequency Division Duplex, abbreviated as "FDD") system, an LTE time division duplex (Time Division Duplex, abbreviated as "TDD") system, a universal mobile telecommunication system (Universal Mobile Telecommunication System, abbreviated as "UMTS"), and the like.

It should also be understood that in embodiments of the present invention, a terminal device may also be called a user equipment (User Equipment, abbreviated as "UE"), a mobile station (Mobile Station, abbreviated as "MS"), a mobile terminal (Mobile Terminal), and the like; the terminal device can communicate with one or more core networks through a radio access network (Radio Access Network, abbreviated as "RAN"), for example, the terminal device may be a mobile phone (or a "cellular" phone), or a computer with a mobile terminal. For example, the terminal device may also be a portable mobile device, a pocket mobile device, a handheld mobile device, a built-in mobile device of the computer or a car-mounted mobile device, and exchange voice and/or data with the radio access network.

In the embodiments of the present invention, a base station may be a base station (Base Transceiver Station, abbreviated as "BTS") in the GSM or the CDMA or be a base station (NodeB, abbreviated as "NB") in the WCDMA, or be an evolved base station (Evolutional Node B, abbreviated as "eNB or e-NodeB") in the LTE. The embodiments of the present invention set no limitation to the base station and the user equipment. However, for the convenience of description, the following embodiments use the eNB and the UE as examples.

Figure 1:
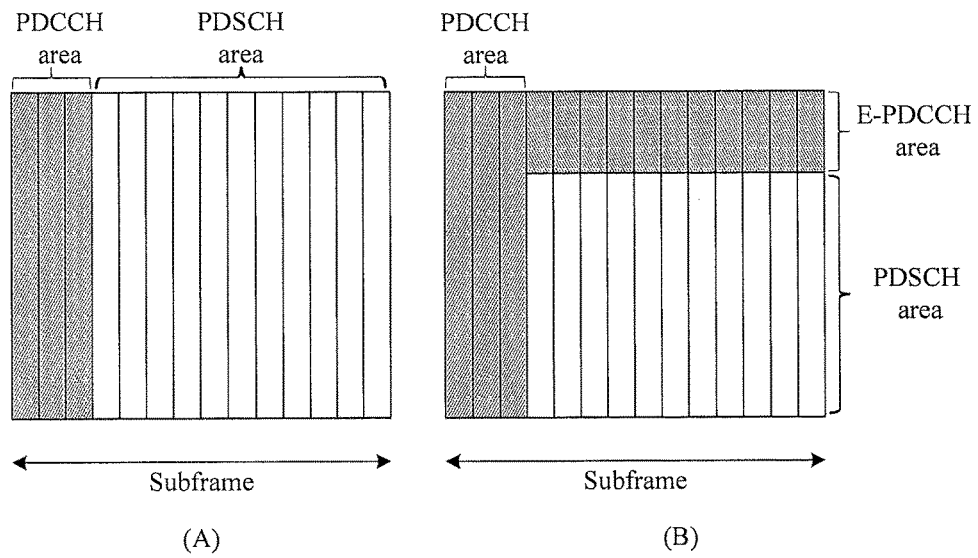
FIG. 1 is a schematic diagram illustrating multiplexing of a PDCCH and a PDSCH according to an embodiment of the present invention.

FIG. 1 is a schematic diagram illustrating multiplexing of a PDCCH and a PDSCH according to an embodiment of the present invention. As shown in FIG. 1 (A), a PDCCH and a PDSCH are time division multiplexed into one subframe. Without loss of generality, a universal cyclic prefix is used as an example herein. Each subframe (1 ms) includes two time slots, with each time slot including seven orthogonal frequency division multiplexing (Orthogonal Frequency Division Multiplexing, abbreviated as "OFDM") symbols; each OFDM symbol includes NRB×12 resource elements (Resource Elements, abbreviated as "REs"), where NRB refers to the quantity of resource blocks (Resource Block, abbreviated as "RB") corresponding to the system bandwidth; a PDCCH is transmitted in first n (n=1, 2, 3) OFDM symbols of a first time slot, where n is variable and may be indicated by a physical control format indicator channel (Physical Control Format Indicator Channel, abbreviated as "PCFICH") and remaining OFDM symbols are used to transmit a PDSCH.

In addition to a PDCCH used for downlink scheduling, the PDCCH area further includes a PDCCH used for uplink scheduling, a physical hybrid ARQ indicator channel (Physical Hybrid ARQ Indicator Channel, abbreviated as "PHICH") used to transmit uplink ACK/NACK information through an HARQ, and a PCFICH used to indicate the number of OFDM symbols included in the PDCCH area. It should be understood that in the following descriptions, unless otherwise specified, the PDCCH is always used for downlink scheduling. Each PDCCH is formed by 1/2/4/8 continuous control channel elements (Control Channel Element, abbreviated as "CCE"), where each CCE is formed by 36 REs, and the number of CCEs forming each PDCCH is determined by the size of the PDCCH and channel information of a user equipment corresponding to the PDCCH.

The number of REs included in the PDCCH area is limited by the number of OFDM symbols used in the PDCCH. In addition, if it is further considered that some REs in the PDCCH area need to be used in the PCFICH, the PHICH, and the PDCCH that is used for uplink scheduling, the number of remaining REs limits the number of PDCCHs used for downlink scheduling, that is, it limits the quantity of user equipments scheduled in the downlink direction. Because of that, the PDCCH is enhanced, that is, some resources are split from the original PDSCH area to transmit an E-PDCCH. As shown in FIG. 1 (B), the PDCCH, the E-PDCCH, and the PDSCH are time division multiplexed into one subframe. In this way, the capacity of the PDCCH can be increased, and meanwhile the quantity of scheduled user equipments can be increased.

Figure 2:
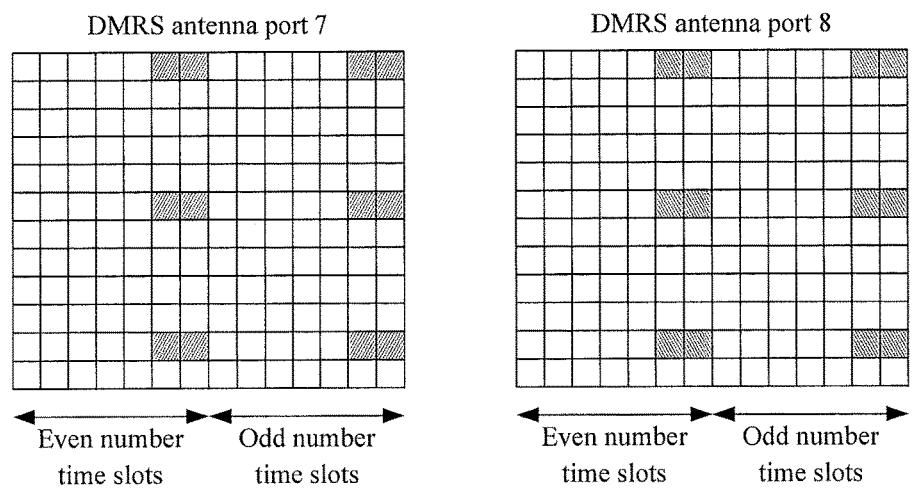
FIG. 2 is a schematic diagram of a DMRS when a transmission rank is 2 according to an embodiment of the present invention.

FIG. 2 is a schematic diagram of a DMRS when a transmission rank is 2 according to an embodiment of the present invention. As shown in FIG. 2, when a transmission rank of a scheduled user equipment is 1 or 2, 12 REs in a pair of resource blocks are used to transmit DMRSs, where two DMRSs are code division multiplexed when the transmission rank is 2; when the transmission rank of the scheduled user equipment is greater than 2, 24 REs in a pair of resource blocks are used to transmit the DMRSs, where a plurality of DMRSs is time-frequency division multiplexed and code division multiplexed. It should be understood that transmission mode 9 of the LTE Rel-10 communication system is a DMRS-based PDSCH transmission, that is, DMRSs are transmitted in resource blocks scheduled by a user equipment; each DMRS defines one antenna port, and data at each layer of the PDSCH is mapped to a corresponding antenna port; the number of DMRSs is equal to the number of data block layers of the PDSCH or the transmission rank of the scheduled user equipment.

Figure 3:
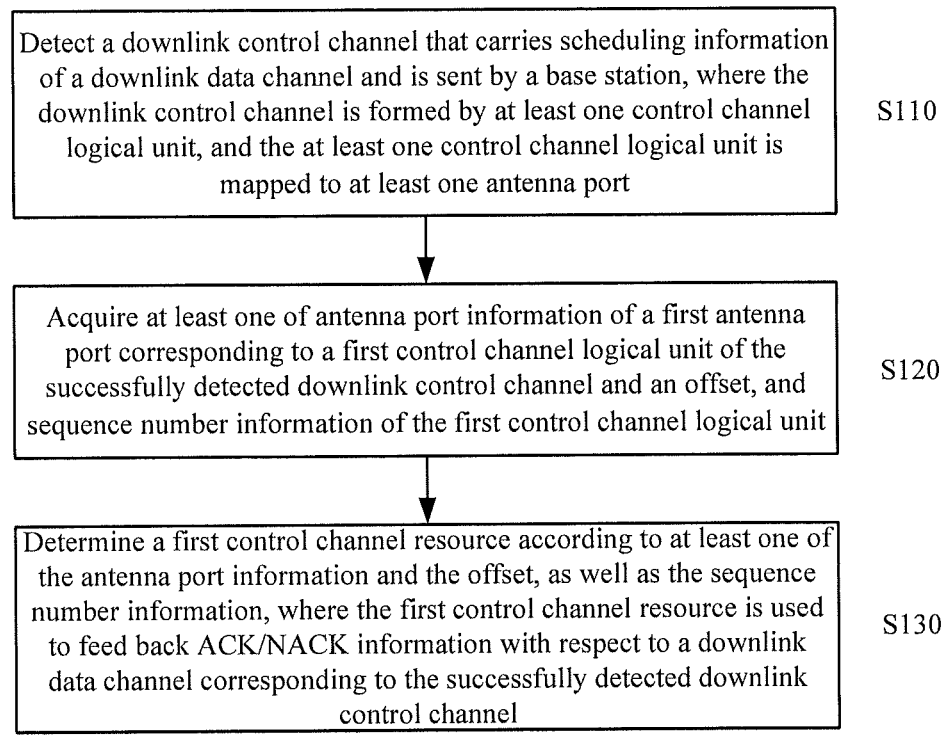
FIG. 3 is a schematic flowchart of a method for determining a control channel resource according to an embodiment of the present invention.

FIG. 3 is a schematic flowchart of a method 100 for determining a control channel resource according to an embodiment of the present invention. As shown in FIG. 3, the method 100 includes the following steps:

S110. Detect a downlink control channel that carries scheduling information of a downlink data channel and is sent by a base station, where the downlink control channel is formed by at least one control channel logical element, and the at least one control channel logical element is mapped to at least one antenna port.

S120. Acquire at least one of antenna port information of a first antenna port corresponding to a first control channel logical element of the successfully detected downlink control channel and an offset, and sequence number information of the first control channel logical element.

S130. Determine a first control channel resource according to the sequence number information and at least one of the antenna port information and the offset, where the first control channel resource is used to feed back ACK/NACK information with respect to a downlink data channel corresponding to the successfully detected downlink control channel.

To dynamically determine a control channel resource used by a user equipment to feed back the ACK/NACK information, the user equipment may dynamically determine, by performing the method 100 and according to the sequence number information of the control channel logical element and at least one of antenna port information corresponding to a control channel logical element and an offset, a control channel resource used to feed back ACK/NACK information. In addition, different control channel resources can be determined for different user equipments. In this way, a problem of conflict on control channel resources between different user equipments can be avoided.

Figure 4:
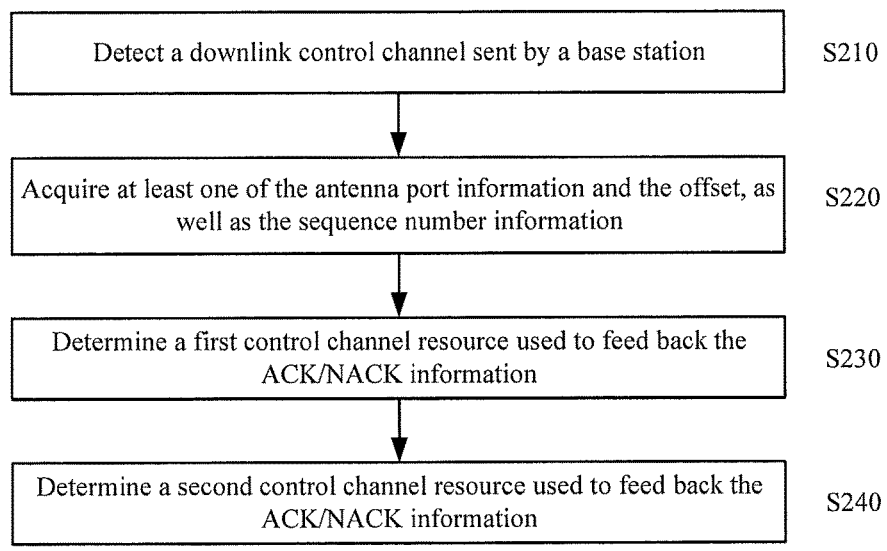
FIG. 4 is a schematic flowchart of a method for determining a control channel resource according to another embodiment of the present invention.

FIG. 4 is a schematic flowchart of a method 200 for determining a control channel resource according to another embodiment of the present invention. As shown in FIG. 4, in S210, a user equipment detects a downlink control channel that carries scheduling information of a downlink data channel and is sent by a base station. In the embodiment of the present invention, the downlink control channel may include an E-PDCCH, the downlink data channel may include a PDSCH. The E-PDCCH carries scheduling information of the PDSCH, and the E-PDCCH is formed by at least one control channel logical element, where the at least one control channel logical element is mapped to a physical resource block in at least one antenna port. Optionally, at least one control channel logical element corresponding to one user equipment is mapped to the same antenna port. Optionally, the antenna port is a DMRS antenna port. It should be understood that the E-PDCCH and the PDSCH that are sent by the base station are an E-PDCCH and a PDSCH that are related to at least one scheduled user equipment, and the at least one antenna port corresponds to the at least one control channel logical element, where the at least one control channel logical element forms the E-PDCCH of the at least one user equipment scheduled by the base station.

In the embodiment of the present invention, because the E-PDCCH is sent in the PDSCH area, the E-PDCCH may also uses a transmission manner similar to the DMRS-based transmission manner of the PDSCH. The E-PDCCH cannot use an HARQ technology used by the PDSCH. Therefore, the E-PDCCH has a higher transmission performance requirement than the PDSCH. To ensure transmission performance and transmission efficiency of the E-PDCCH, a resource occupied by the E-PDCCH needs to be variable. Therefore, performance requirements of the E-PDCCH can be satisfied by performing adaptive modulation and/or coding according to different channel conditions, for example, a signal-to-noise ratio, and the like. In addition, with respect to different PDSCH transmission manners, the E-PDCCH uses different formats, for example, data blocks of the control channel are different. Therefore, the resource of the E-PDCCH also needs to be variable.

Due to randomness of dynamic scheduling, the user equipment needs to perform a blind detection on the E-PDCCH. If the resource of the E-PDCCH is variable with a great flexibility, complexity of user blind detection is increased. To compromise between the complexity of blind detection and the transmission efficiency of the E-PDCCH, a resource granularity of the E-PDCCH may be defined, and the resource granularity herein may be defined as a control channel logical element. According to control channel formats and channel conditions of the E-PDCCH, it may be determined that one E-PDCCH is formed by Mn control channel logical elements, that is, Mn control channel logical elements carry data of the E-PDCCH, where n=0, 1, . . . , N−1, and N refers to the number of aggregation levels of the control channel logical elements. The number of control channel logical elements forming each E-PDCCH is related to a control channel format used by a scheduled user equipment and channel conditions, and Mn control channel logical elements forming each E-PDCCH are mapped to a group of physical resource blocks in the at least one antenna port. It should be understood that the control channel logical element in this specification refers to a virtual resource block or a CCE.

In S220, the user equipment acquires the sequence number information and at least one of the antenna port information and the offset. Optionally, the user equipment acquires, according to a pre-defined or notified mapping relationship between the first control channel logical element and the physical resource block, the sequence number information and/or the antenna port information.

The sequence number information is information related to a sequence number of the first control channel logical element, where the first control channel logical element forms the E-PDCCH successfully detected by the user equipment. Optionally, the sequence number information includes a sequence number of a control channel logical element being the first in the first control channel logical element. It should be understood that the sequence number information may also include a sequence number of another control channel logical element in the first control channel logical element, for example, a sequence number of a control channel logical element associated with an antenna port used by the control channel in the first control channel logical element. The sequence number may also be a sequence number of a virtual resource block or a physical resource block where a control channel logical element in the first control channel logical element is located, for example, the sequence number information is a sequence number of a virtual resource block or a physical resource block where the first control channel logical element in the first control channel logical element is located or a sequence number changed from the sequence number of the virtual resource block or the physical resource block, where the one physical resource block or the one virtual resource block includes at least one control channel logical element, for example, the number of control channel logical elements included in the one physical resource block or the one virtual resource block is 1, 2, 3, or 4.

The antenna port information is related information of a first antenna port where a physical resource block corresponding to the first control channel logical element is located. Preferably, the information of the first antenna port where the physical resource block corresponding to the first control channel logical element in the first control channel logical element is located may also be the information of a first antenna port where a physical resource block, on which there is another control channel logical element of the first control channel logical element, is located Optionally, the antenna port information at least includes one of the sequence number of the first antenna port and the quantity of antenna ports of the at least one antenna port. That is, the antenna port information includes the sequence number of the first antenna port, and the antenna port information may include the quantity of antenna ports of the at least one antenna port; the antenna port information may also include the sequence number of the first antenna port and the quantity of antenna ports of the at least one antenna port.

The offset may be semi-statically configured by a high layer or be dynamically notified by the base station, and the offset may be set with respect to the user equipment, that is, offsets of user equipments are not completely the same; the offset may also be set with respect to a cell of the user equipment, that is, offsets of all user equipments in a cell are the same; the offset may also be set with respect to a user equipment and a cell of the user equipment, that is, the offset includes two parts: the first part is set with respect to the user equipment, and the second part is set with respect to a cell of the user equipment.

Embodiments of the present invention are hereinafter described with reference to a mapping relationship between a control channel logical element and a physical resource block according to an embodiment of the present invention shown in FIG. 5.

Figure 5:
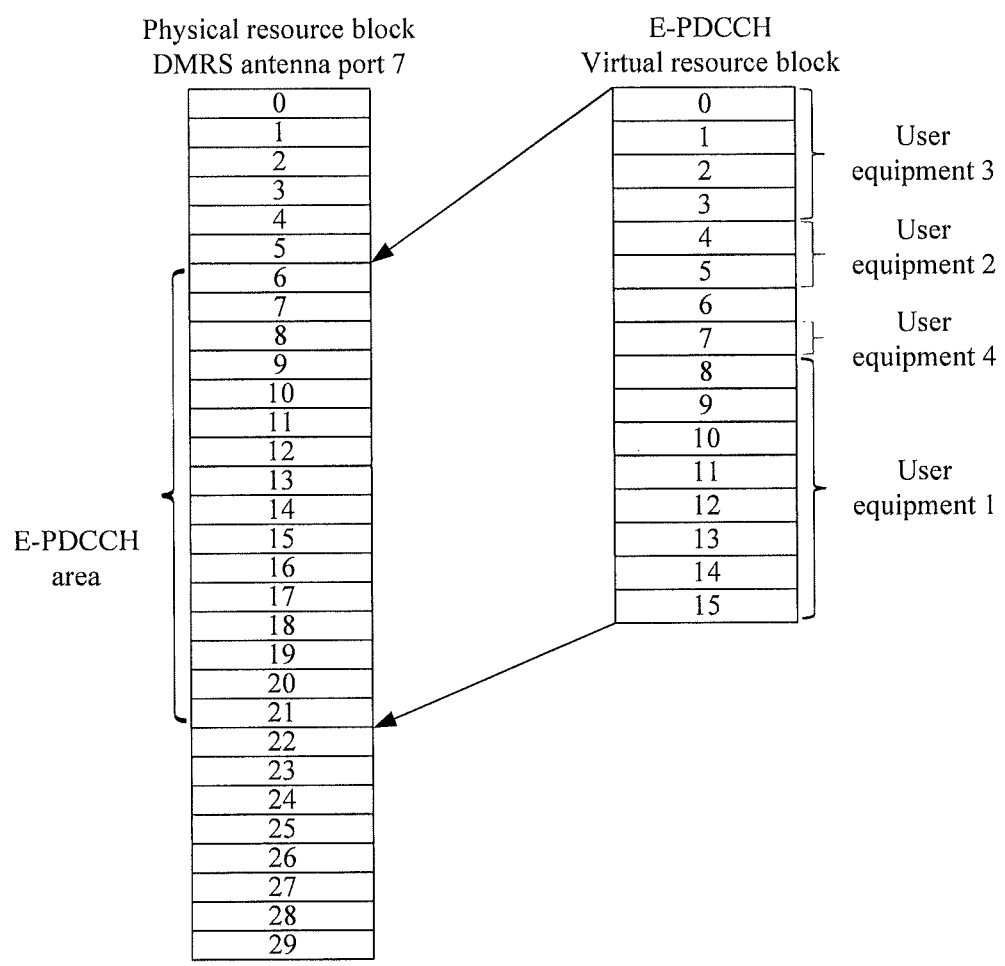
FIG. 5 is a schematic diagram of a mapping relationship between a control channel logical element and a physical resource block according to an embodiment of the present invention.

As shown in FIG. 5, a user equipment extracts received data, that is, data carried by an E-PDCCH, from received physical resource blocks 6 to 21 of DMRS antenna port 7, where physical resource blocks 6 to 21 correspond to virtual resource blocks 0 to 15 of the E-PDCCH. The user equipment performs a blind detection on an E-PDCCH in the virtual resource blocks to obtain an E-PDCCH corresponding to the user equipment. For example, an E-PDCCH of user equipment 1 corresponds to virtual resource blocks 8 to 15, an E-PDCCH of user equipment 2 corresponds to virtual resource blocks 4 to 5, an E-PDCCH of user equipment 3 correspond to virtual resource blocks 0 to 3, and an E-PDCCH of user equipment 4 correspond to virtual resource block 7.

The user equipment may determine, according to the successfully detected E-PDCCH, a sequence number $n_{VRB}$ of a first virtual resource block forming the E-PDCCH, that is, a virtual resource block where a first control channel logical element is located, where $n_{VRB}=0, 1, \ldots, N_{VRB}-1$, and $N_{VRB}$ refers to the number of configured virtual resource blocks, and a sequence number $n_{DMRS}$ of a first antenna port corresponding to a physical resource to which the first virtual resource block is mapped, where $n_{DMRS}=0, 1, \ldots, N_{DMRS}-1$, and $N_{DMRS}$ refers to the number of first antenna ports, for example, the sequence numbers $n_{DMRS}$ of DMRS antenna ports 7 and 8 are 0 and 1 respectively. For example, in the embodiment shown in FIG. 5, the sequence number $n_{VRB}$ of the first virtual resource block of user equipment 1 is 8, the sequence number $n_{VRB}$ of the first virtual resource block of user equipment 2 is 4, the sequence number $n_{VRB}$ of the first virtual resource block of user equipment 3 is 0, the sequence number $n_{VRB}$ of the first virtual resource block of user equipment 4 is 7, the number $N_{VRB}$ of configured virtual resource blocks is 16, the sequence number $n_{DMRS}$ of the first antenna port is 0, and the number $N_{DMRS}$ of first antenna ports is 1. Optionally, the sequence number of the first virtual resource block may also use a sequence number of a physical resource block corresponding to the first virtual resource block. For example, if the sequence number of a physical resource block corresponding to the first virtual resource block of user equipment 3 is 6, the sequence number of the first virtual resource block may be 6.

In S230, the user equipment determines a first control channel resource used to feed back the ACK/NACK information. Optionally, the user equipment may determine the first control channel resource according to acquired sequence number information and antenna port information. Optionally, the user equipment may determine the first control channel resource according to acquired sequence number information and offset. Optionally, the user equipment may determine the first control channel resource according to acquired sequence number information, antenna port information, and offset. For example, the user equipment may determine, according to the acquired sequence number information and antenna port information, the sequence number $n_{ACK/NACK}^1$ of the first control channel resource by using equation (1) or equation (2) below.

$$n_{ACK/NACK}^1 = n_{VRB} \times N_{DMRS} + n_{DMRS} \quad (1)$$

$$n_{ACK/NACK}^1 = n_{DMRS} \times N_{VRB} + n_{VRB} \quad (2)$$

The mapping relationship shown in FIG. 5 is still used as an example for illustration. For example, according to equation (1) or equation (2), user equipment 1 determines that the sequence number $n_{ACK/NACK}^1$ of the first control channel resource is 8, user equipment 2 determines that the sequence number $n_{ACK/NACK}^1$ of the first control channel resource is 4, user equipment 3 determines that the sequence number $n_{ACK/NACK}^1$ of the first control channel resource is 0, and user equipment 4 determines that the sequence number $n_{ACK/NACK}^1$ of the first control channel resource is 7.

Therefore, by using the method according to the embodiment of the present invention, a control channel resource used to feed back ACK/NACK information can be dynamically determined according to sequence number information of the control channel logical element and at least one of antenna port information of an antenna port corresponding to a control channel logical element and an offset. In addition, different control channel resources can be determined for different user equipments. In this way, a problem of conflict on control channel resources between different user equipments can be avoided.

In the embodiment of the present invention, optionally, the user equipment determines, according to the sequence number information and at least one of the antenna port information and the offset, the first control channel resource used to feed back the ACK/NACK information. The offset may be semi-statically configured by a high layer or be dynamically notified; the offset may be set with respect to the user equipment, that is, offsets of user equipments may not be completely the same; the offset may also be set with respect to a cell of the user equipment, that is, offsets of all user equipments in a cell are the same. For example, the sequence number $n_{ACK/NACK}^1$ of the first control channel resource can be determined by using equation (3) or equation (4) including an offset $N_{ACK/NACK}^1$ below.

$$n_{ACK/NACK}^1 = N_{ACK/NACK}^1 + n_{VRB} \times N_{DMRS} + n_{DMRS} \quad (3)$$

$$n_{ACK/NACK}^1 = N_{ACK/NACK}^1 + n_{DMRS} \times N_{VRB} + n_{VRB} \quad (4)$$

It should be understood that for a control channel sent in the PDCCH area, a corresponding resource used to feed back uplink ACK/NACK information is determined by using a sequence number of a first CCE of the PDCCH and an offset $N_{PUCCH}^{(1)}$. If resources with respect to the PDCCH and the E-PDCCH and used to feed back uplink ACK/NACK information are allocated continuously, a boundary between these two types of resources used to feed back the ACK/NACK information needs to be determined, that is, an offset $N_{ACK/NACK}^1$ needs to be determined. Because the number of CCEs in the PDCCH area is related to the number of OFDM symbols used in the PDCCH, $N_{ACK/NACK}^1$ may be determined in each subframe dynamically according to the number of OFDM symbols of the PDCCH, where $N_{ACK/NACK}^1$ includes the offset $N_{PUCCH}^{(1)}$ used to determine a resource used to feed back ACK/NACK information with respect to the PDCCHP and the quantity of CCEs in the PDCCH area. Because the number of OFDM symbols used in the PDCCH is represented by a PCFICH, the user equipment may acquire the number of OFDM symbols of the PDCCH by detecting the PCFICH, and calculate the number of CCEs used in the PDCCH, that is, it determines the number of resources reserved for the corresponding PDCCH and used to feed back ACK/NACK information. In this way, the user equipment can determine, according to a sequence number of a next resource used to feed back ACK/NACK information, the offset $N_{ACK/NACK}^1$ of a control channel resource used to feed back ACK/NACK information.

Figure 6:
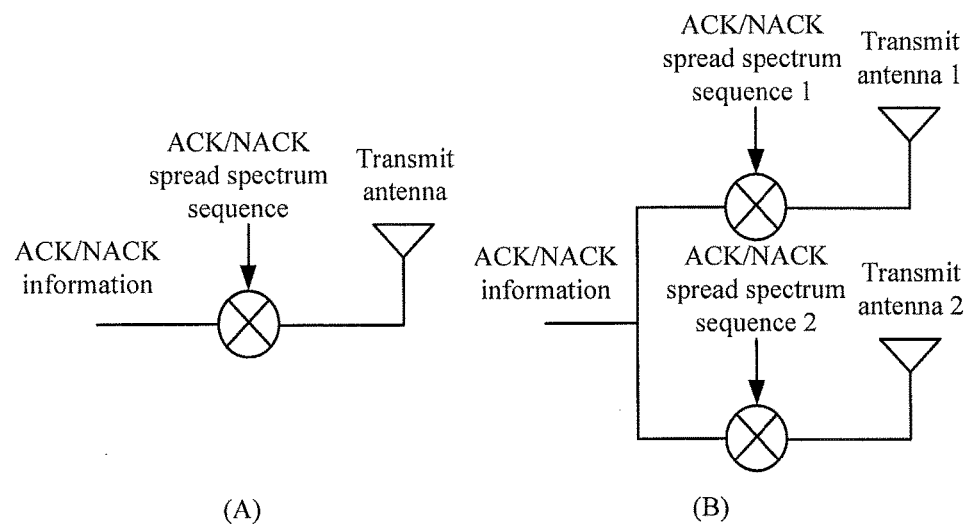
FIG. 6 is a schematic diagram illustrating sending of ACK/NACK information according to an embodiment of the present invention.

It should be understood that after the user equipment determines the first control channel resource used to feed back ACK/NACK information, because feeding back uplink ACK/NACK information is based on code division multiplexing, the first control channel resource determined by each user equipment is actually a spread spectrum sequence in one resource block. After modulating the spread spectrum sequence by using the ACK/NACK information, the user equipment sends the modulated spread spectrum sequence over an antenna, so that uplink ACK/NACK information is fed back, as shown in FIG. 6 (A).

When the user equipment sends the ACK/NACK information by using a spatial orthogonal resource transmit diversity (Spatial Orthogonal Resource Transmit Diversity, abbreviated as "SORTD") scheme, the method 200 for determining a control channel resource according to the embodiment of the present invention further includes the following steps:

S240. The user equipment determines a second control channel resource used to feed back the ACK/NACK information. Optionally, the user equipment may determine the second control channel resource according to at least one of a sequence number of a control channel logical element next to the first control channel logical element in the acquired first control channel logical element and a sequence number of a second antenna port next to the first antenna port.

For example, the user equipment may determine the second control channel resource according to at least one of the antenna port information of the first antenna port and the offset, as well as the sequence number of the control channel logical element next to the first control channel logical element. The user equipment may also determine the second control channel resource according to at least one of the sequence number information of the first control channel logical element and the offset, as well as the sequence number of the second antenna port. The user equipment may also determine the second control channel resource according to the sequence number of the control channel logical element next to the first control channel logical element and the sequence number of the second antenna port, or according to the sequence number of the control channel logical element next to the first control channel logical element, the sequence number of the second antenna port, and the offset.

It should be understood that similar to the determining of the first control channel resource, the user equipment may determine, according to at least one of a sequence number of another control channel logical element next to the first control channel logical element and a sequence number of another antenna port next to the first antenna port, the second control channel resource used to feed back ACK/NACK information. Assuredly, the user equipment may also determine the second control channel resource by referring to at least one of the sequence number information of the first control channel logical element, the antenna port information of the first antenna port, and the offset.

Specifically, for example, the user equipment may determine, according to a sequence number of a second control channel logical element next to the first control channel logical element and the antenna port information of the first antenna port, a second control channel resource used to feed back the ACK/NACK information. For example, the user equipment determines a sequence number $n_{ACK/NACK}^2$ of the second control channel resource by using equation (5) or equation (6) below.

$$n_{ACK/NACK}^2 = N_{ACK/NACK}^1 + (n_{VRB}+1) \times N_{DMRS} + n_{DMRS} \quad (5)$$

$$n_{ACK/NACK}^2 = N_{ACK/NACK}^1 + n_{DMRS} \times N_{VRB} + (n_{VRB}+1) \quad (6)$$

For example, the user equipment may also determine, according to the sequence number of the second antenna port next to the first antenna port, and the quantity of the antenna ports, and the sequence number information of the first control channel logical element, the second control channel resource used to feed back the ACK/NACK information. For example, the user equipment may determine the sequence number $n_{ACK/NACK}^2$ of the second control channel resource by using equation (7) or equation (8) below.

$$n_{ACK/NACK}^2 = N_{ACK/NACK}^1 + n_{VRB} \times N_{DMRS} + (n_{DMRS}+1) \quad (7)$$

$$n_{ACK/NACK}^2 = N_{ACK/NACK}^1 + (n_{DMRS}+1) \times N_{VRB} + n_{VRB} \quad (8)$$

It should be understood that performance of feeding back uplink ACK/NACK information can be enhanced by using a dual-antenna transmit diversity SORTD scheme. When the user equipment uses the SORTD, each antenna needs to have a spread spectrum sequence and the spread spectrum sequences in the two antennas are different; then, the user equipment modulates the spread spectrum sequences in different antennas by using the same ACK/NACK signal, and sends the modulated spread spectrum sequences in these two antennas respectively. In this way, the uplink ACK/NACK information is fed back, as shown in FIG. 6 (B).

It should also be understood that the specific process of the HARQ may be as follows: During downlink scheduling, the user equipment needs to detect an E-PDCCH and a corresponding PDSCH. If detecting the E-PDCCH successfully, the user equipment demodulates the corresponding PDSCH according to information in the E-PDCCH, and then, the user equipment needs to feed back a demodulated result of the PDSCH in the uplink direction. If the PDSCH is demodulated correctly, the user equipment feeds back ACK information to the eNB, indicating that the user equipment has already received the sent data correctly, so that the eNB can transmit new data blocks; otherwise, the user equipment feeds back NACK information to the eNB, indicating that the user equipment fails to receive data correctly, and the eNB needs to retransmit the data. If the E-PDCCH is not detected correctly, the user equipment considers that no PDSCH is scheduled to the user equipment, and therefore gives no feedback in the uplink direction. This is called discontinuous transmission (Discontinuous Transmission, abbreviated as "DTX").

It should be understood that the foregoing sequence numbers of the processes do not imply an execution order of the processes, and the execution order of the processes should be determined according to their functions and internal logic, which is not intended to limit the implementation process according to the embodiment of the present invention.

The embodiment of the present invention has been hereinbefore described in detail with reference to the mapping relationship between the control channel logical element and the physical resource block shown in FIG. 5. It should be understood that the control channel logical element shown in FIG. 5 is cell-specific, that is, the base station allocates a control channel logical element set to each cell, and the E-PDCCH of each scheduled user equipment in each cell corresponds to at least one control channel logical element in the control channel logical element set. Therefore, the sequence numbers of the first control channel logical elements forming the successfully detected E-PDCCH of each user equipment are different. The embodiment of the present invention is merely described through an example where the control channel logical element is cell-specific, but the embodiment of the present invention is not limited to the cell-specific control channel logical element.

Figure 7:
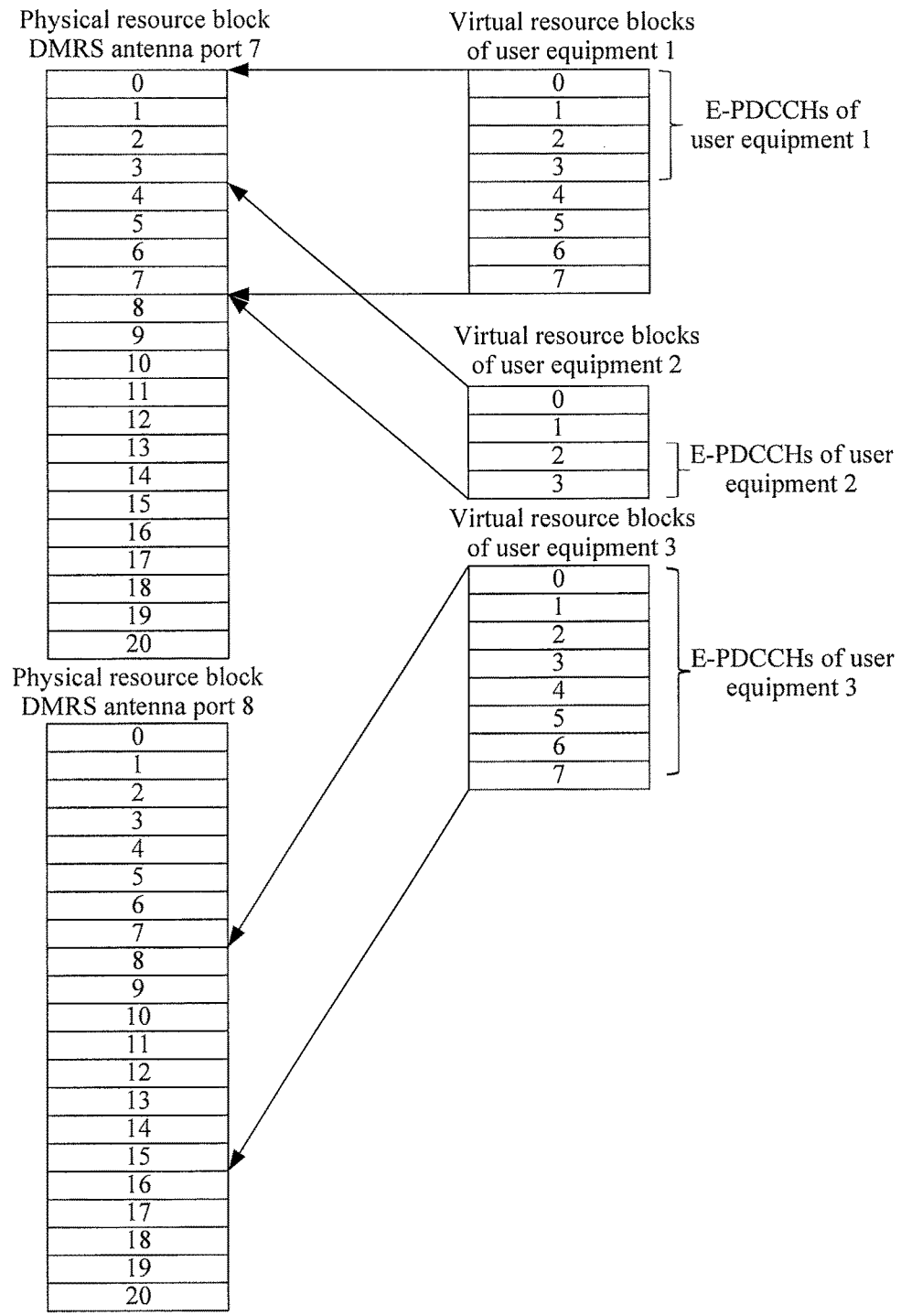
FIG. 7 is a schematic diagram of a mapping relationship between a control channel logical element and a physical resource block according to another embodiment of the present invention.

The control channel logical element may also be user equipment-specific, that is, the base station allocates a control channel logical element set to each scheduled user equipment, and the E-PDCCH of each scheduled user equipment corresponds to at least one control channel logical element in each control channel logical element set. Therefore, the sequence numbers of the first control channel logical elements forming the successfully detected E-PDCCH of each user equipment may be the same or different, and physical resource blocks of different user equipments may be overlapped or separated, as shown in FIG. 7. For example, a physical resource block of user equipment 1 is partly overlapped with a physical resource block of user equipment 2, but the physical resource block of user equipment 1 and the physical resource block of user equipment 2 are completely separated from a physical resource block of user equipment 3. In this case, the user equipment can also determine, according to the acquired parameters such as the sequence number information of the first control channel logical element, the antenna port information of the first antenna port, and the offset, a first and/or a second control channel resource used to feed back the ACK/NACK information, where the offset is user equipment-specific, that is, the base station configures an offset for each user equipment individually, and determines the first and/or the second control channel resource used to feed back the ACK/NACK information, in this case, the offset may be notified by using a semi-static configuration manner of a high layer. Further, on the basis of the user equipment-specific offset, there is another offset which is specific to a cell of the user equipment. In this case, the offset includes two parts, and both of the two parts may be notified by using a semi-static configuration manner of a high layer.

Therefore, by using the method for determining a control channel resource according to the embodiment of the present invention, a control channel resource used to feed back ACK/NACK information can be dynamically determined according to at least one of antenna port information of an antenna port corresponding to a control channel logical element and an offset, as well as sequence number information of the control channel logical element. In addition, different control channel resources can be determined for different user equipments. In this way, a problem of conflict on control channel resources between different user equipments can be avoided.

The method for determining a control channel resource according to the embodiments of the present invention has been hereinbefore described in detail with reference to FIG. 3 to FIG. 7. The following describes a user equipment for determining a control channel resource according to an embodiment of the present invention with reference to FIG. 8 to FIG. 9.

Figure 8:
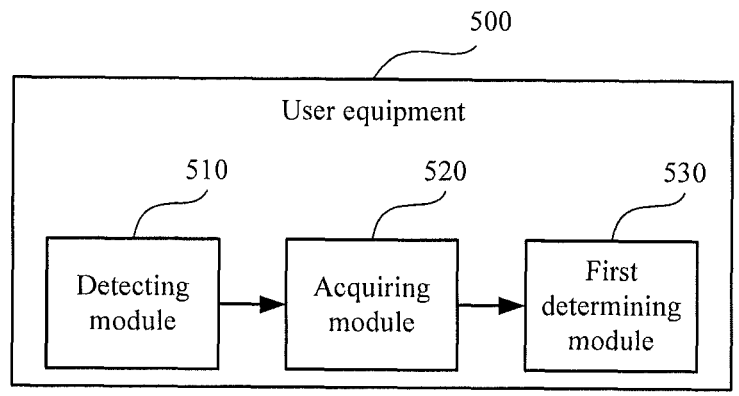
FIG. 8 is a schematic block diagram of a user equipment for determining a control channel resource according to an embodiment of the present invention.

FIG. 8 is a schematic block diagram of a user equipment 500 for determining a control channel resource according to an embodiment of the present invention. As shown in FIG. 8, the user equipment 500 includes:

a detecting module 510, configured to detect a downlink control channel that carries scheduling information of a downlink data channel and is sent by a base station, where the downlink control channel is formed by at least one control channel logical element, and the at least one control channel logical element is mapped to at least one antenna port;

an acquiring module 520, configured to acquire at least one of antenna port information of a first antenna port corresponding to a first control channel logical element of the downlink control channel successfully detected by the detecting module 510 and an offset, and sequence number information of the first control channel logical element; and a first determining module 530, configured to determine a first control channel resource according to the sequence number information and at least one of the antenna port information and the offset that are acquired by the acquiring unit 520, where the first control channel resource is used to feed back ACK/NACK information with respect to a downlink data channel corresponding to the successfully detected downlink control channel.

By using the user equipment for determining a control channel resource according to the embodiment of the present invention, a control channel resource used to feed back ACK/NACK information can be dynamically determined according to sequence number information of the control channel logical element and at least one of antenna port information of an antenna port corresponding to a control channel logical element and an offset. In addition, different control channel resources can be determined for different user equipments. In this way, a problem of conflict on control channel resources between different user equipments can be avoided.

In the embodiment of the present invention, the sequence number information is information related to a sequence number of a first control channel logical element. The sequence number information of the first control channel logical element includes a sequence number of a control channel logical element being the first in the first control channel logical element. It should be understood that the sequence number information may also include a sequence number of another control channel logical element in the first control channel logical element, for example, a sequence number of a control channel logical element associated with an antenna port used by the control channel in the first control channel logical element. The sequence number may also be a sequence number of a virtual resource block or a physical resource block where a control channel logical element in the first control channel logical element is located, for example, the sequence number information is a sequence number of a virtual resource block or a physical resource block where the first control channel logical element in the first control channel logical element is located or a sequence number changed from the sequence number of the virtual resource block or the physical resource block, where the physical resource block or the virtual resource block includes at least one control channel logical element, for example, the number of the included control channel logical elements is 1, 2, 3, or 4. The antenna port information of the first antenna port at least includes one of the sequence number of the first antenna port and the quantity of antenna ports of the at least one antenna port.

Optionally, the detecting module 510 is specifically configured to detect the downlink control channel sent by the base station, and the at least one control channel logical element is mapped to a physical resource block of the at least one antenna port; and the acquiring module 520 is specifically configured to acquire the sequence number information and/or the antenna port information according to a predefined or notified mapping relationship between the first control channel logical element and the physical resource block.

Optionally, the acquiring module 520 is specifically configured to acquire at least one of the antenna port information and the offset, where the offset is dynamically notified by the base station or be semi-statically configured by a high layer.

Optionally, the acquiring module 520 is specifically configured to acquire at least one of the antenna port information and the offset, where the offset is set with respect to at least one of the user equipment and a cell of the user equipment.

In the embodiment of the present invention, the antenna port may be a demodulation reference signal DMRS antenna port.

Figure 9:
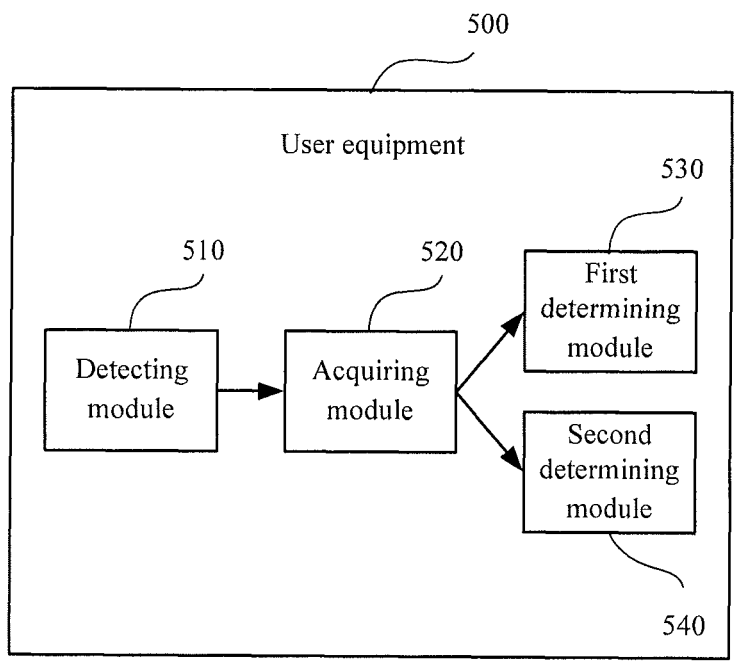
FIG. 9 is a schematic block diagram of a user equipment for determining a control channel resource according to another embodiment of the present invention.

Optionally, as shown in FIG. 9, the user equipment 500 may further include:

a second determining module 540, configured to: when the ACK/NACK information is sent by using SORTD, determine, according to at least one of a sequence number of a control channel logical element next to a control channel logical element being the first in the first control channel logical element and a sequence number of a second antenna port next to the first antenna port, a second control channel resource used to feed back the ACK/NACK information.

It should be understood that the second determining module 540 may determine the second control channel resource according to the sequence number of the control channel logical element next to the first control channel logical element and at least one of the antenna port information of the first antenna port and the offset. The second determining module 540 may also determine the second control channel resource according to the sequence number of the second antenna port and at least one of the sequence number information of the first control channel logical element and the offset. The second determining module 540 may further determine the second control channel resource according to the sequence number of the control channel logical element next to the first control channel logical element and the sequence number of the second antenna port, or according to the sequence number of the control channel logical element next to the first control channel logical element, the sequence number of the second antenna port, and the offset.

It should be understood that similar to the process of determining the first control channel resource by the first determining module 530, the second determining module 540 may determine, according to at least one of a sequence number of another control channel logical element next to the first control channel logical element and a sequence number of another antenna port next to the first antenna port, the second control channel resource used to feed back ACK/NACK information. Assuredly, the second determining module 540 may also determine the second control channel resource by referring to at least one of the sequence number information of the first control channel logical element, the antenna port information of the first antenna port, and the offset.

The user equipment 500 for determining a control channel resource according to the embodiment of the present invention may correspond to the user equipment provided in the embodiment of the present invention, and the detecting module 510, the acquiring module 520, and the first determining module 530 in the user equipment 500 may be configured to perform S110, S120, and S130 in FIG. 3 and S210, S220, and S230 in FIG. 4, and the second determining module 540 in the user equipment 500 may be configured to perform S240 in FIG. 4, which will not be further described herein for conciseness.

By using the user equipment for determining a control channel resource according to the embodiment of the present invention, a control channel resource used to feed back ACK/NACK information can be dynamically determined according to sequence number information of the control channel logical element and at least one of antenna port information of an antenna port corresponding to a control channel logical element and an offset. In addition, different control channel resources can be determined for different user equipments. In this way, a problem of conflict on control channel resources between different user equipments can be avoided.

A person of ordinary skill in the art may be aware that, in combination with the examples described in the embodiments disclosed in this specification, units and algorithm steps can be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments according to the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a combination of a software functional unit and hardware.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device or the like) to perform all or a part of the steps of the methods described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any equivalent modification or replacement easily figured out by a person skilled in the art within the technical scope of the present invention shall fall within the protection scope of the present invention. Therefore, the protection scope of the present invention shall be subject to the protection scope of the claims.

What is claimed is:

1. A method for determining a control channel resource, comprising:
   detecting, by a user equipment device (UE), a downlink control channel of a base station, wherein the downlink control channel carries scheduling information of a downlink data channel and is formed by at least one control channel logical element, and the at least one control channel logical element is mapped to at least one antenna port of the base station;
   acquiring, by the UE, antenna port information of a first antenna port of the base station corresponding to a first control channel logical element of a successfully detected downlink control channel, an offset, and sequence number information of the first control channel logical element; and
   determining, by the UE, a first control channel resource according to the sequence number information, the antenna port information and the offset, wherein the first control channel resource is used to feed back acknowledgment (ACK)/non-acknowledgment (NACK) information with respect to a downlink data channel corresponding to the successfully detected downlink control channel.

2. The method according to claim 1, wherein the sequence number information comprises a sequence number of a control channel logical element which is the first control channel logical element.

3. The method according to claim 2, further comprising:
   when sending the ACK/NACK information by using a spatial orthogonal resource transmit diversity (SORTD) scheme, determining, by the UE, according to at least one of a sequence number of a control channel logical element next to the first control channel logical element in the first control channel logical element and a sequence number of a second antenna port next to the first antenna port, a second control channel resource used to feed back the ACK/NACK information.

4. The method according to claim 1, wherein the antenna port information at least comprises one of a sequence number of the first antenna port and the quantity of antenna ports of the at least one antenna port.

5. The method according to claim 1, wherein that the at least one control channel logical element is mapped to at least one antenna port comprises:
   mapping, by the UE, the at least one control channel logical element to a physical resource block in the at least one antenna port; and
   the acquiring, by the UE, the sequence number information comprises:
   acquiring, by the UE, the sequence number information according to a pre-defined or notified mapping relationship between the first control channel logical element and the physical resource block; and/or
   the acquiring, by the UE, the antenna port information comprises:
   acquiring, by the UE, the antenna port information according to a pre-defined or notified mapping relationship between the first control channel logical element and the physical resource block.

6. The method according to claim 1, wherein the offset is dynamically notified by the base station or be semi-statically configured by a high layer.

7. The method according to claim 6, wherein the offset is set with respect to at least one of the user equipment device and a cell of the user equipment device.

8. The method according to claim 1, wherein the antenna port is a demodulation reference signal (DMRS) antenna port.

9. The method according to claim 1, wherein the at least one control channel logical element corresponding to the UE is mapped to one antenna port.

10. A user equipment device for determining a control channel resource, comprising:
    a receiver, coupled with a processor, configured to receive a downlink control channel of a base station, wherein the downlink control channel carries scheduling information of a downlink data channel, and is formed by at least one control channel logical element, and the at least one control channel logical element is mapped to at least one antenna port of the base station;
    the processor, configured to detect the downlink control channel received by the receiver;
    acquire antenna port information of a first antenna port of the base station corresponding to a first control channel logical element of a successfully detected downlink control channel, an offset, and sequence number information of the first control channel logical element; and
    determine a first control channel resource according to the sequence number information, the antenna port information and the offset; and
    a transmitter, configured to, through the determined first control channel resource, feed back acknowledgment (ACK)/non-acknowledgment (NACK) information with respect to a downlink data channel corresponding to the successfully detected downlink control channel.

11. The user equipment device according to claim 10, wherein the sequence number information comprises a sequence number of a control channel logical element which is the first control channel logical element.

12. The user equipment device according to claim 11,
    wherein the processor, is further configured to: when the ACK/NACK information is sent by using a spatial orthogonal resource transmit diversity (SORTD) scheme, determine, according to at least one of a sequence number of a control channel logical element next to the first control channel logical element in the first control channel logical element and a sequence number of a second antenna port next to the first antenna port, a second control channel resource used to feed back the ACK/NACK information.

13. The user equipment device according to claim 10, wherein the antenna port information at least comprises one of a sequence number of the first antenna port and the quantity of antenna ports of the at least one antenna port.

14. The user equipment device according to claim 10, wherein the processor is specifically configured to detect the downlink control channel sent by the base station, and the at least one control channel logical element is mapped to a physical resource block in the at least one antenna port; and
    the processor is specifically configured to acquire the sequence number information according to a pre-defined or notified mapping relationship between the first control channel logical element and the physical resource block; and/or
    the processor is specifically configured to acquire the antenna port information according to a pre-defined or notified mapping relationship between the first control channel logical element and the physical resource block.

15. The user equipment device according to claim 10, wherein the processor is specifically configured to acquire at least one of the antenna port information and the offset, wherein the offset is dynamically notified by the base station or semi-statically configured by a high layer.

16. The user equipment device according to claim 10, wherein the processor is specifically configured to acquire at least one of the antenna port information and the offset, wherein the offset is set with respect to at least one of the user equipment device and a cell of the user equipment device.

17. The user equipment device according to claim 10, wherein the antenna port is a demodulation reference signal (DMRS) antenna port.

18. The user equipment device according to claim 10, wherein the at least one control channel logical element corresponding to the UE is mapped to one antenna port.

* * * * *